United States Patent [11] 3,607,032

| [72] | Inventors | Dietmar Kalz<br>Leverkusen;<br>Gerhard Wolfrum, Opladen, both of<br>Germany |
|---|---|---|
| [21] | Appl. No. | 780,883 |
| [22] | Filed | Dec. 3, 1968 |
| [45] | Patented | Sept. 21, 1971 |
| [73] | Assignee | Farbenfabriken Bayer Aktiengesellschaft<br>Leverkusen, Germany |
| [32] | Priority | Dec. 20, 1967 |
| [33] | | Germany |
| [31] | | P 16 67 513.1 |

[54] PROCESS FOR THE PRODUCTION OF HYDROXYLAMINE-O-SULPHONIC ACID
6 Claims, No Drawings

[52] U.S. Cl.............................................. 23/166
[51] Int. Cl............................................... C01b 21/54, C01b 21/00
[50] Field of Search................................. 23/139, 166

[56] References Cited
UNITED STATES PATENTS
3,281,209  10/1966  Wehrmeister et al.......... 23/166
FOREIGN PATENTS
1,008,263  10/1957  Germany...................... 23/166
OTHER REFERENCES
Matsuguma et al., "Inorganic Syntheses," Vol. 5, 1957, pp. 122– 125. 23/166

Primary Examiner—Herbert T. Carter
Attorney—Connolly & Hutz

ABSTRACT: Process for the production of hydroxylamine-O-sulphonic acid from hydroxylamine or its salts and chlorosulphonic acid or oleum, wherein the reaction is performed in an inert organic diluent preferably, a halogenated aliphatic and/or aromatic hydrocarbon at a temperature of from 0° C. to 80° C.

PROCESS FOR THE PRODUCTION OF HYDROXYLAMINE-O-SULPHONIC ACID

This invention relates to a new process for the production of hydroxylamine-O-sulfonic acid of the formula:

$$H_2N-O-SO_3H$$

which may readily be carried out on a commercial scale.

Hydroxylamine-O-sulfonic acid is used very widely in the synthesis of organic compounds such as for example dyestuffs and intermediates for dyestuffs of pharmaceutical products, to introduce an $NH_2$ group, particularly into nitrogen atoms already present in the molecule, so as to form N-amino compounds. Hydroxylamine-O-sulfonic acid is also useful as a polymerization catalyst in the production of high polymers.

According to known methods hydroxylammonium salts in sulfuric acid solution have been reacted with oleum at from 100° C. to 130° C. Alternatively, hydroxylammonium chloride or sulfate is reacted in pure chlorosulfonic acid (F. Somer, O. F. Schulz, M. Nassau Z. Anorg. Allg. Chem. 147, 142 (1925) R. Gosl and A. Meuwsen, Chem.Ber. 92, 2526 (1959). On a commercial scale however the removal and purification of hydroxylamine-O-sulfonic acid from acid from concentrated sulfuric acid or chlorosulfonic acid is highly expensive.

German Auslegeschrift No. 1,008,263 relates to the production of hydroxylamine-O-sulfonic acid by reacting hydroxylamine trisulfonic acid with hydroxylammonium sulfate in concentrated sulfuric acid at a temperature of 130° C. In this case, the end product is isolated by centrifuging.

According to U.S. Pat. specification No. 2,935,378, liquid sulfur dioxide is used as a solvent for the hydroxylammonium salts employed as starting materials. In this known process, the hydroxylammonium salts are reacted with liquid sulfur trioxide at a temperature of −15° C.

Finally, processes are also known in which the hydroxylamine-O-sulfonic acid is isolated from the reaction mixture of digestion with diethyl ether and is subsequently purified.

A process for the production of hydroxylamine-O-sulfonic acid from hydroxylamine or its salts and chlorosulfonic acid or oleum has now been found in which the reaction is carried out at a temperature of from about 0° C. to 80° C. in an inert organic diluent.

The process according to the invention makes it much easier to produce hydroxylamine-O-sulfonic acid, especially since isolation of the end product merely involves filtration or distillation.

In one preferred embodiment of the process, a diluent in which the hydroxylamine-O-sulfonic acid is insoluble is used. We have surprisingly found that there is no need at all to use concentrated sulfuric acid or pure chlorosulfonic acid or liquid sulfur dioxide as the reaction medium. Instead hydroxylammonium salts or even hydroxylamine itself can be reacted with chlorosulfonic acid or oleum under extremely moderate reaction conditions to form hydroxylamine-O-sulfonic acid provided that the reaction is carried out in an inert organic diluent. The reactants are reacted in substantially stoichiometric quantities, in which case it can be of advantage to use one of the reactants in a slight excess of say 10–15 percent.

The hydroxylammonium salts are preferably used because they are readily available, salts both of inorganic acids and of organic acids being suitable, for example, the salts of hydroxylamine with sulfuric acid, hydrochloric acid or hydrobromic acid, phosphoric acid, nitric acid, acetic acid or adipic acid. Hydroxylammonium sulfate which is readily obtained on a commercial scale is preferably used.

Suitable inert organic diluents include liquids of the kind which are stable with respect both to the starting materials and to the end product. It is preferred to use liquids of the kind in which the hydroxylamine-O-sulfonic acid is insoluble because it may then be readily isolated by filtration and washing with the diluent used. However, in cases where hydroxylamine or hydroxylammonium halides and chlorosulfonic acid or oleum are used, it is also possible to use a diluent in which the hydroxylamine-O-sulfonic acid is soluble because in this case the hydrogen halide formed during the reaction escapes from the reaction medium as a gas, so that the hydroxylamine-O-sulfonic acid may be isolated by distilling off the diluent.

Suitable diluents include, in particular, halogenated aliphatic and aromatic hydrocarbons with boiling points of from about 40° C. to 250° C. It is also possible although not as satisfactory to use nonhalogenated hydrocarbons with suitable boiling points such as, for example, petrol fractions, benzene, xylenes or tri- to hexa-alkyl substituted benzine derivatives. Normally however, they are partly affected during the reaction which is shown by a darkening in color of the reaction medium. The following halogenated aliphatic and aromatic hydrocarbons are mentioned as examples of the preferred inert diluents: methylene chloride, chloroform, carbon tetrachloride, fluorodichloromethane, fluorotrichloromethane, ethylene chloride, 1, 1, 2, 2 - tetrafluorodichloroethane, chlorobenzene, o-dichlorobenzine, trichlorobenzine and chlorinated naphthalene derivatives such as, for example, 1-chloronaphthalene and the like.

The quantity of the diluent should be large enough to maintain the reaction mixture in liquid condition, i.e. the suspension should be well stirrable and filterable. Normally at least two parts of diluent are necessary per part of hydroxylamine or its salts, good results are obtained with four to 20 parts of diluent. Excess quantities are not harmful but less economic.

The process may readily be carried out in acid-resistant vessels equipped with a stirring mechanism. The hydroxylammonium salts are preferably introduced with the inert diluent and the chlorosulfonic acid or the oleum added with stirring. After the reactants have been combined, the reaction mixture is stirred for a while at the appropriate reaction temperature, approximately 0° C. to 80° C., in order to complete the reaction, i.e. in order to transform the hydroxylamine or its salts quantitatively into the sulfonic acid derivative. In cases, where low boiling diluents are used, the reaction mixture is boiled under reflux. On completion of the reaction, the reaction mixture is cooled to room temperature and the hydroxylamine-O-sulfonic acid is purified by filtration and washing with the diluent used.

The invention is illustrated in the following examples in which quantities are expressed in parts by weight unless otherwise stated. The hydroxylamine-O-sulfonic acid content was determined by iodometric and acidimetric titration.

EXAMPLE 1

24.7 parts of neutral hydroxylammonium sulfate are suspended in 75 parts of 1, 2, 4-trichlorobenzene, and 38.5 parts of chlorosulfonic acid are added dropwise with stirring to the resulting suspension. The temperature is kept at 80° C. for another 30 minutes during which the reaction mixture is continuously stirred, and after which it is sharply suction filtered and the filtration residue is washed with 1, 2, 4-trichlorobenzene. Hydroxylamine-O-sulfonic acid is obtained in a yield of 94 percent of the theoretical (86 percent pure).

EXAMPLE 2

24.7 parts of neutral hydroxylammonium sulfate are suspended in 75 parts of carbon tetrachloride, and 38.5 parts of chlorosulfonic acid are added dropwise with stirring to the resulting suspension. The mixture is kept boiling under reflux for another 30 minutes during which it is stirred and after which is is suction filtered and washed with carbon tetrachloride. The hydroxylamine-O-sulfonic acid which is 89 percent pure is obtained in a yield of 95 percent of the theoretical.

EXAMPLE 3

24.7 parts of neutral hydroxylammonium sulfate are suspended in 75 parts of methylene chloride and 38.5 parts of chlorosulfonic acid are added dropwise to the resulting suspension with stirring. The mixture is then kept boiling for another 30 minutes during which it is stirred, after which it is suction filtered and the filtration residue is washed with methylene chloride. 91 percent pure hydroxylamine-O-sulfonic acid is obtained in a yield of 100 percent of the theoretical.

EXAMPLE 4

24.7 parts of neutral hydroxylammonium sulfate are suspended in 75 parts of methylene chloride and 40.7 parts of 65 percent oleum are added dropwise with stirring to the resulting suspension. The mixture is kept boiling for another 30 minutes during which it is stirred and after which it is suction filtered and the filtration residue is washed with methylene chloride. 90 percent hydroxylamine-O-sulfonic acid is obtained in a yield of 92 percent of the theoretical.

I claim:

1. A process for producing hydroxylamine-O-sulfonic acid which comprises reacting substantially stoichiometric quantities of a hydroxylamine reactant selected from the group consisting of hydroxylamine and hydroxylamine salt and an acid reactant selected from the group consisting of oleum/and chlorosulfonic acid at a temperature of from about 0° to 80° C. in a liquid diluent selected from the group consisting of halogenated aliphatic hydrocarbon and halogenated aromatic hydrocarbon having a boiling point of between about 40° and 250° C. and recovering resulting hydroxylamine-O-sulfonic acid.

2. The process of claim 1 wherein said selected hydroxylamine reactant is employed in an amount of 10 to 15 percent excess over the stoichiometric amount.

3. The process of claim 1 wherein said selected acid reactant is used in an amount of 10 to 15 percent excess over the stoichiometric amount.

4. The process of claim 1 wherein two to 20 parts by weight of selected diluent are employed per part by weight of selected hydroxylamine reactant.

5. The process of claim 1 wherein the hydroxylamine-O-sulfonic acid product is insoluble in the selected diluent.

6. The process of claim 1 wherein the selected hydroxylamine reactant is suspended in two to 20 parts by weight of diluent per part by weight of selected hydroxylamine reactant and the resultant suspension is mixed with selected acid reactant.